United States Patent Office 3,497,524
Patented Feb. 24, 1970

3,497,524
EPOXY RESINS CURED WITH A TERTIARY AMINE COMPLEX OF TETRACHLORO- OR TETRABROMOPHTHALIC ACID
William L. Payne and Charles A. Fetscher, Olean, N.Y., assignors to The Dexter Corporation, a corporation of Connecticut
No Drawing. Filed July 12, 1967, Ser. No. 652,686
Int. Cl. C08g 30/12, 30/16
U.S. Cl. 260—831                              11 Claims

ABSTRACT OF THE DISCLOSURE

Water insoluable acid addition salts obtained by reacting tertiary amines, which are known to be active as catalysts and co-curing agents in epoxy resin systems, with tetrachlorophthalic acid (TCPA) or tetrabromophthalic acid (TBPA), provide improved catalysts and co-curing agents which have unusual stability at room temperature and excellent reactivity at resin curing temperatures, and which are essentially odorless and non-irritating. These acid addition salts normally contain acid equivalents and amine equivalents in a 4:2 (or 2:1) ratio, although with a strongly basic, low molecular weight amine such as triethylamine, the ratio is 4:1, whereas with a weakly basic high molecular weight amine such as 2,4,6 tridimethylaminomethyl phenol the ratio is 4:3.

The new tertiary amine salts catalyze both liquid and solid epoxy resin systems as well as such systems in which filler and coloring components make up as much as 75 to 80% of the total weights. The proportion of active amine required is about 0.05 to 2% based on the weight of the reactive components i.e. exclusive of fillers and coloring agents. This means that the proportion of tertiary amine salt can vary from about 0.25% to 10% of the weight of the reactive components.

BACKGROUND OF THE INVENTION

The use of tertiary amines as catalysts or co-curing agents in epoxy resin systems is well-known. Among the widely used tertiary amines are 2-methyl-imidazole, dimethylbenzylamine, 4-dimethylaminomethyl phenol and 2,4,6-tridimethylaminomethyl phenol. These are quite reactive at room temperature and the working life of a batch is generally limited to from a few minutes to perhaps several hours. A longer working life than can be realized with the free tertiary amines is frequently essential. It was found that the room temperature reactivity of these amines can be substantially reduced without sacrificing the adequacy of the cure by converting the amine into a salt by reaction with an acid. Various salts of the useful amines give good, long, working life but the same full, final cure as the free amines. A commonly used salt is the tri (2 ethyl hexoic acid) salt of tridimethylaminomethyl phenol. Its use and advantages are outlined by Lee and Neville in Epoxy Resins (1957), pages 96 to 99. Many other salts of tertiary amines have been proposed as partly latent catalysts.

The salts of the prior art are, like the great majority of salts of simple acids and bases, water soluble, and frequently hygroscopic. The first factor complicates the preparation and isolation. The second feature is obviously undesirable. The absorption of water by a liquid or solid epoxy system could seriously degrade the physical properties of the cured resin. Furthermore the water soluble salts have objectionable odors substantially as intense as those of the free amines.

It has now been found in accordance with the present invention that the problems of rapid reactivity, hygroscopicity and odor as above described can be overcome if the tertiary amines are converted to certain salts or salt-like complexes which are substantially insoluble in water. The invention applies generally to tertiary amines which have recognized catalytic or co-curing action in epoxy resin systems, but depends on the use of a very limited class of acids in forming the salts or salt-like complexes. In fact, the only two acids which have thus far been found capable of producing the desirable water insoluble salts or complexes are tetrachlorophthalic acid (TCPA) and tetrabromophthalic acid (TBPA).

The new salts or salt-like complexes, hereinafter referred to as acid addition salts are prepared by simple heating of the amine and the acid (or anhydride) in water, as for example by heating at reflux for about four hours with constant stirring. This effects a substantially quantative conversion of the tertiary amine to an insoluble suspension of the acid addition salt which is readily recovered by filtration, washing, and drying. The resulting product is a free flowing white to slightly off-white powder, sometimes crystal in nature, and which is essentially odor free. This is in sharp contrast to the objectionable and irritating odors which characterize the free tertiary amines.

The water insoluble acid addition salts contain a characteristic number of acid groups or acid equivalents for each amine group or amine equivalents with such characteristic number of acid groups differing from one amine to another. It has been found that the ratio of acid groups to amine groups will generally be 4:1, 4:2, or 4:3. The reason for this variation, although not completely understood, appears to be in part an effect of basicity, with stronger basicity tending toward a higher acid:amine ratio; and in part an effect of molecular weight (and steric hindrance) with higher molecular weight tending to foster a lower acid:amine ratio. By way of illustration, with a strongly basic, low molecular weight amine such as triethylamine the ratio of acid groups to amine groups is 4:1, whereas with a weakly basic, high molecular weight amine such as 2,4,6-tridimethylaminomethyl phenol the ratio is 4:3. With the majority of tertiary amines, however, the ratio of acid groups or equivalents to amine groups or equivalents is found to be 4:2, or as more simply expressed a 2:1 ratio.

The insoluble acid addition salts are essentially non-reactive at room temperature with other components of solid or powdered epoxy resin systems permitting such solid formulations to be stored for long periods of time without deterioration; and even in liquid epoxy resin systems the new water insoluble salts show extremely slow reactivity at room temperature. In both solids and liquid systems, however, the amine salts behave in much the same manner as the free tertiary amines when the system is heated to curing temperatures of the order of 100–250° C. Thus the invention is considered to reside not only in the new acid addition salts of TCPA and TBPA, but also in the improved epoxy resin systems which contain such salts as catalysts or co-curing agents.

In such improved epoxy resin systems the resin component is preferably a bisphenol A resin or an epoxidized novolac resin. More specifically a bisphenol A resin should have an epoxy equivalent weight of about 170 to 280 for a liquid system and about 280 to 6000 for a solid system; and an epoxy novolac resin should have an epoxy equivalent weight of about 156 to 325. Hardening agents for these resins which are catalyzed by tertiary amines include carboxylic acid anhydrides and phenolic novolac resins. The proportion of resin to hardening agent is preferable in the range of 0.6 to 1.2 equivalents of hardening agent to each epoxy equivalent of resin, and the proportion of active tertiary amine required is about 0.05 to 2% based on the combined weight of resin and hardener. This corresponds generally with about 0.25 to 10% by weight of the tertiary amine acid addition salt, with the amount being 0.25 to 6% for the TCPA salts and 0.4 to 10% for the somewhat heavier TBPA salts.

In the various resin systems conventional fillers and coloring agents can be employed in amounts as high as 75 to 80% of the total weight of the composition. Typical coloring agents include phthalocyanine blues and greens, mercury-cadium and iron oxide reds, carbon black, and titanium oxide white, with the amount of coloring agent, if present, varying from a trace to about 2% by weight of the complete composition. Typical fillers include mica, silica, silicates, talcs, barytes, and the like. When compositions are intended for molding a stearate such as calcium stearate or glycerol monostearate or other mold release agent should be included in the amount of about 0.5 to 2% of the weight of the complete composition.

The following examples show preparation of the new insoluble acid addition salts of tertiary amines with TCPA and TBPA as well as demonstrating the inability to form comparable insoluble salts with other conventional acids and anhydrides. Other examples demonstrate the effectiveness of the new acid addition salts in catalyzing typical epoxy resin systems. It is to be understood, however, that these examples are given by way of illustration and not of limitation.

EXAMPLE I

A 1-liter, 3-neck reaction flask equipped with a mechanical stirrer and reflux condenser was charged with 68.64 grams (0.24 mole) tetrachlorophthalic anhydride anl 500 ml. water. Stir rapidly to slurry the solid. Add 31.80 grams (0.12 mole) 2,4,6-tridimethylaminoethyl phenol. Rinse in with an additional 100 ml. water. Heat at reflux for four hours stirring constantly. The entire charge was cooled to about 20° C. The product was suction filtered and dried overnight at 80° C. in a forced draft oven. Recovered 91.4 grams white, friable, odorless nonhygroscopic powder. The material was analyzed and found to contain 3.38 milliequivalents of nitrogen per gram (theory 3.44). The product in this instance contains a 4:3 ratio af acid equivalents to amine equivalents.

EXAMPLE II

A 2-liter, 3-neck reaction flask equipped as above was charged with 272.3 grams (0.586 mole) tetrabromophthalic anhydride and 500 ml. water. Stir rapidly to slurry the solid. Add 77.7 grams (0.293 mole) 2,4,6-tridimethlaminomethyl phenol. Rinse in with an additional 150 ml. water. Heat at reflux for four hours stirring constantly. An additional 100 ml. water was added during the reaction period to render the charge more fluid. The charge was cooled to about 20° C. The product was suction filtered and dried overnight to 80° C. in a forced draft oven. Recovered 340.5 grams powdered product. The material had a slightly pink color and was odorless and non-hygroscopic. It was analyzed and found to contain 2.24 milliequivalents of nitrogen per gram (theory 2.44). The product in this instance contains a 4:3 ratio of acid equivalents to amine equivalents.

EXAMPLE III

A 1-liter, 3-neck recation flask equipped as above was charged with 127.5 grams (0.446 mole) tetrachlorophthalic anhydride and 350 ml. water. Stir rapidly to slurry the solid. Add 22.5 grams (0.223 mole) triethylamine. Heat at reflux for 4 hours stirring constantly. The charge was cooled to about 20° C. The product was suction filtered and dried overnight at 80° C. in a forced draft oven. Recovered 145.2 grams of odorless, white powdery product. The material was analyzed and found to contain 1.27 milliequivalents of nitrogen per gram (theory 1.41). The product in this instance has a 4:1 ratio of acid equivalent to amine equivalents.

EXAMPLE IV

A 1-liter, 3-neck reaction flask equipped as above was charged with 101.6 grams (0.325 mole) tetrachlorophthalic acid hemihydrate and 350 ml. water. Stir rapidly to slurry the solid. Add 48.4 grams (0.325 mole) triethanolamine. Heat at reflux for 4 hours stirring constantly. The charge was cooled to about 20° C. The product was suction filtered ad dried overnight at 80° C. in a forced draft oven. Recovered 118.5 grams odorless, white crystalline product. The material was analyzed and found to contain 2.18 milliequivalents of nitrogen per gram (theory 2.21). The product in this instance has a 4:2 (or 2:1) ratio of acid equivalents to amine equivalents.

EXAMPLE V

A 2-liter, 3-neck reaction flask equipped as above was charged with 272.0 grams (0.951 mole) tetrachlorophthalic anhydride and 650 ml. water. Stir rapidly to slurry the solid. Add 78.0 grams (0.951 mole) 2-methylimidazole. Heat at reflux for four hours stirring constantly. The charge was cooled to about 20° C. The product was suction filtered and dried overnight at 80° C. in a forced draft oven. Recovered 358.3 grams shiny, white crystalline material. It was analyzed and found to contain 2.59 milliequivalents of titratable nitrogen per gram, theory 2.59. In addition to the above, similar materials have been prepared in like manner from the reaction of tetrachlorophthalic anhydride with the following amines.

Imidazole
2-ethyl-4-methylimidazole
Triethylenediamine
4 (N,N-dimethylaminomethyl) phenol
Benzyldimethylamine With each of these amines the product has a 4:2 (or 2:1) ratio of acid equivalents to amine equivalents, and is an odorless, and substantially white solid.

The next two examples demonstrate unsuccessful attempts to prepare similar insoluble acid addition salts from other conventional acids and anhydrides.

EXAMPLE VI

A 2-liter, 3 neck reaction flask equipped as above was charged with 194.6 grams (1.172 moles) isophthalic acid and 500 ml. of water. Stirred rapidly to disperse the solid. 155.4 grams (0.586 mole) of 2,4,6-tridimethylaminomethyl phenol was then added. The last of the amine was rinsed into the batch with an additional 150 ml. of water. Heated at reflux for 4 hours with constant stirring. It was cooled down to about 20° C. The solid product was filtered off and dried overnight at 80° C. It weighed 50.5 grams. This compares with an expected yield of about 250 grams. It was analyzed and found to contain 0.53 milliequivalents of nitrogen per gram. The expected salt would show 5.02 meq. of nitrogen per gram. This analysis could fit isophthalic acid contaminated with a small percentage of amine. This acid is not operable for the simple preparation and isolation of a useful amine salt.

When the foregoing procedure is repeated using terephthalic acid in place of isophthalic acid a similar result is obtained. In both instances the small amount of recovered solid appears to be essentially a fraction of the original acid.

EXAMPLE VII

A 2-liter, 3 neck reaction flask equipped as above was charged with 184.7 grams (1.248 moles) phthalic anhydride and 500 ml. water. Stir rapidly to slurry the solid. Add 165.3 grams (0.624 mole) 2,4,6-tridimethylaminomethyl phenol. Rinse in with an additional 150 ml. water. Heat at reflux for four hours stirring constantly. The mixture was a clear solution. Refrigerate overnight at about 50° C. There was no solid product.

The foregoing procedure was repeated with the following acids and anhydrides:

Methyl nadic anhydride (x-methyl endomethylene tetrahydrophthalic anhydride)
Phthalic anhydride
Tetrahydrophthalic anhydride
Hexahydrophthalic anhydride
4,5-dibromo hexahydro phthalic anhydride
Chlorendic anhydride (hexachloroendomethylene tetrahydrophthalic anhydride)
Trimellitic anhydride
Isophthalic acid
Terephthalic acid
Adipic acid
Azelaic acid
Succinic acid
Maleic acid
Dodecenylsuccinic anhydride
Itaconic acid
Isatoic anhydride With all of these acids and anhydrides there was no solid product formed. Attempts have been made to react the foregoing acids and anhydrides with other tertiary amines, and in no instances has it been possible to prepare a solid water insoluble product comparable to the acid addition salts prepared in Examples I to V.

The fact that a tertiary amine might give an insoluble salt with one acid and not with another would not be surprising. It is indeed surprising, however, that all tertiary amines tested give insoluble salts with one type of acid and soluble salts with all other acids. The reason for the difference in behavior is not understood. It is not explainable on the fact that TCPA and TBPA are aromatic, since the three phthalic acids and trimellitic acid (all aromatics) gain soluble salts. It is not that the useful acids are dibasic, since all of the cited inoperable acids are also dibasic. It is not that they are halogenated, since two of the inoperable anhydrides are halogenated. The difference does not arise from water insolubility of TCPA and TBPA, since TCPA is more water soluble than several of the inoperable acids. The formation of insoluble tertiary amine salts appears to be a surprisingly specific property of TCPA and TBPA.

A special advantage of these insoluble tertiary amine salts, in addition to their stability at room temperature, is their essentially odor free and non-irritating nature. At resin curing temperatures, however, the insoluble tertiary amine salts perform essentially the same catalytic or co-curing function as the corresponding free amines.

The following examples will show typical solid and liquid epoxy resin systems employing tertiary amine salts of TCPA or TBPC. In some of the examples relating to solid resin systems performance is evaluated by the "spiral flow" test. This is a standard test established by the Epoxy Molded Materials Institute of 250 Park Ave., New York, N.Y., and identified as EMMI-1-66. A good epoxy molding powder will show little change in spiral flow during extended periods of storage. Thus change in spiral flow with age is an effective measure of the stability of a molding powder.

EXAMPLE VIII

Three molding powders were prepared, powder I containing a free amine, 2,4,6 tridimethylaminoethyl phenol, mixed 1 part to 3 parts by weight with calcium silicate, powder II containing the TCPA salt of 2,4,6 tridimethylaminoethyl phenol, and powder III containing the TBPA salt of the same amine. All powders contained as Resin A an epoxy novolac resin having an epoxy equivalent weight of 179–181 and functionality of 3.3, and as Resin B a phenolic novolac having a viscosity (35% in ethanol) of 14 to 16 cst. The complete formulations were:

| Component | Powder, percent | | |
|---|---|---|---|
| | I | II | III |
| Resin A | 16.74 | 16.12 | 16.12 |
| Resin B | 9.58 | 9.23 | 9.23 |
| SiO$_2$, 325 mesh | 67.00 | 67.00 | 67.00 |
| ¼" glassfiber | 5.00 | 5.00 | 5.00 |
| Black pigment, 200 mesh | 1.35 | 0.35 | 0.35 |
| Glycerol monostearate | 0.83 | 0.80 | 0.80 |
| Free amine (with calcium silicate) | 0.50 | | |
| TCPA amine salt | | 1.50 | |
| TBPA amine salt | | | 1.50 |

Resins A and B were melted together, cooled and ground to a powder which was then blended with the other components, and the mixture was fused together on a two-roll mill heated to about 180° F. After cooling, the resulting cake was ground to a coarse powder.

A small amount of each powder was tested for spiral flow by the method EMMI-1-66 above mentioned. The remainder of each was divided into two portions for storage at 73° F. and 85° F., and samples were again tested for spiral flow after 1, 2, 4 and 8 weeks storage. The results of these spiral flow tests are as follows:

| | Stored at— | | | | | |
|---|---|---|---|---|---|---|
| | 73° F. | | | 85° F. | | |
| Time of test | I | II | III | I | II | III |
| Start | 35" | 40" | 36" | 35" | 40" | 36" |
| After 1 week | 34" | 38" | 34" | 29" | 37" | 33" |
| After 2 weeks | 31" | 37" | 33" | 19.5" | 37" | 32" |
| After 4 weeks | 22" | 37" | 33" | 4.5" | 32" | 30" |
| After 8 weeks | 19" | 36.5" | 32" | 1.5" | 26" | 27" |

These figures indicate that powder I containing the free amine is marginally stable for two months when stored at room temperature and very unstable when stored at a very slightly elevated temperature. Powders II and III containing the amine salts are perfectly stable for two months at room temperature and adequately stable at the elevated temperature.

EXAMPLE IX

Two molding powders were prepared, powder I containing as catalyst triethanolamine on a molecular sieve (a commercial latent catalyst) and powder II containing the TCPA salt of 2,4,6-tridimethylaminomethyl phenol as in Example VIII. Both powders contained as Resin A an epoxy novolac resin having an epoxy equivalent weight of 180 and a functionality of about 4, and as Resin B the same phenolic novolac as used in Example VIII. The complete formulations were

| Component | Powder, percent | |
|---|---|---|
| | I | II |
| Resin A | 20.42 | 20.50 |
| Resin B | 10.20 | 10.25 |
| Black pigment | 1.97 | .40 |
| Calcium stearate | 1.00 | .50 |
| SiO$_2$, 325 mesh | 64.37 | 67.10 |
| Free amine, on molecular sieve | 2.04 | |
| TCPA amine salt | | 1.25 |

The components were mixed and fusion blended on a mill as described in Example VIII, then cooled and coarsely ground, and the resulting powders were tested for spiral flow as prepared, and after storage for four weeks at room temperature and at 85° F. The results of these spiral flow tests are as follows:

| | Stored at— | | | |
|---|---|---|---|---|
| | R.T. | | 85° F. | |
| Time of test | I | II | I | II |
| Start | 12" | 25" | 12" | 25" |
| After 4 weeks | 9" | 22" | 3" | 19" |

Even as freshly made the molding powder with the free amine on a molecular sieve has low flow, and this drops off rapidly during storage. The powder with the TCPA amine salt shows satisfactory initial flow and good stability.

EXAMPLE X

A powdered mixture for application by a fluidized bed process was made from the following materials:

| | Parts |
|---|---|
| Solid bisphenol A epoxy resin, epoxy equivalent weight 600 | 10.00 |
| Solid bisphenol A epoxy resin, epoxy equivalent weight 1800 | 35.00 |
| Cyclopentane tetracarboxylic acid dianhydride | 2.85 |
| TCPA salt of 2-methylimidazole | 1.00 |
| Silica powder 95% through 325 mesh | 50.75 |
| Finely powdered titanium oxide | 0.30 |
| Phthalocyanine green pigment | 0.10 |

The above powdered materials were mixed dry in a blender. Processed by sintering on a two-roll mill with one roll heated to about 180° F. This fused the material into a sheet which was lapped into the nip several times to thoroughly homogenize the mixture. The sheet was cooled to room temperature and ground to −70 mesh.

The powder was fluidized in a small laboratory fluidizer. A one-inch square, clean steel bar 5 inches long was preheated at 210° C. for 15 minutes. The hot bar was dipped into the fluidized bed for 5 seconds. It was then removed and the gel time determined. The heavy bar remains hot for several minutes. A probe enables one to tell when the liquid coating gels to a solid. In this instance gel required 14 seconds. This bar and other steel samples of various sizes and shapes were similarly coated and then thoroughly cured by 5 minutes in oven at 210° C. The coatings were smooth and attractive and of good physical properties.

EXAMPLE XI

A molding powder product was prepared from the following composition:

| | Parts |
|---|---|
| Resin A | 4.50 |
| Resin B | 21.00 |
| Finely divided silica filler | 49.45 |
| ¼″ chopped glass strand | 10.00 |
| Carbon black pigment | 0.40 |
| Glyceryl monostearte mold release | 0.75 |
| Calcium stearate mold release | 1.00 |
| Tetrachlorophthalic anhydride | 11.90 |
| TCPA salt of 2-methylimidazole | 1.00 |

The resins are identified as follows:

Resin A.—A solid epoxidized novolac resin having a softening point of about 175° F. and an epoxy equivalent weight of about 225.

Resin B.—A solid epoxy resin prepared from bisphenol A and epichlorohydrin having a softening point of about 175° F. and an epoxy equivalent weight of about 500.

The powder was processed by the following procedure:

The resins, hardener, mold release agents and catalyst were all ground to a fine powder. The fillers and pigment were added and the mixture blended together until uniform. It was then fluxed on a heated 2-roll mill. When cool, the product was ground to a coarse powder suitable for transfer molding. Samples of this powder were transfer molded at 300° F. The gel time of the powder is about 60 seconds, cure time about 5 minutes.

A similar molding powder composition was prepared substituting the tetrachlorophthalic acid salt of 2-ethyl-4-methylimidazole for the catalyst. The gel time of this system is about 50 seconds under the same conditions used above.

EXAMPLE XII

A molding powder composition was prepared as follows:

| | Parts |
|---|---|
| Resin A | 15.50 |
| Resin B | 8.85 |
| Finely divided silica | 67.85 |
| ¼″ chopped glass strand | 5.00 |
| Carbon black pigment | 0.40 |
| Glyceryl monostearate mold release | .90 |
| TBPA salt of 2,4,6 - tridimethylamino methyl phenol | 1.50 |

Resin A.—A semi-solid epoxidized novolac resin having a functionality of about 3.5 and an epoxy equivalent weight of about 175.

Resin B.—A solid novolac phenol-formaldehyde condensation product having a phenolic equivalent weight of about 110. The viscosity of a 35% solution of this resin in ethanol is about 15 centistokes.

The powder was processed as follows:

Resins A and B were melted together at about 250° F. and allowed to cool to ambient temperature. The resulting solid material was ground to a fine powder. The remaining ingredients were added and blended to a uniform composition. The mixture was then fluxed on a 2-roll mill to a uniform sheet. When cool, the sheet was coarse ground to a powder suitable for transfer molding. Samples of this material transfer molded at 300° F. were fully cured in 2 minutes or less. The flow and curing characteristics of this powder were essentially unchanged after three months storage at room temperature.

EXAMPLE XIII

To 10 grams of a conventional liquid epoxy resin, being essentially the diglycidyl ether of bisphenol A, with an epoxy equivalent weight of about 178, was added 10 grams of methyl-4-endomethylene - 1,2 - dicarboxylic anhydride into which had been dissolved ½% by weight of the tetrachlorophthalic acid salt of 2,4,6-tridimethylaminomethyl phenol. Both components were preheated to 125° C. The mixed sample was placed in an oven at 125° C. The sample gelled hard in 45 minutes. A similar sample containing no amine salt was still in the liquid state after 6 hours at 125° C.

EXAMPLE XIV

To 10 grams of a liquid epoxy novolac resin having a functionality slightly greater than 2 and an epoxy equivalent weight of about 175 was added 10 grams of methyl-4-endomethylene-1,2 dicarboxylic anhydride into which had been dissolved ½% by weight of the tetrachlorophthalic acid salt of 2,4,6-tridimethylaminomethyl phenol. Both components were preheated to 125° C. The mixed sample was placed in an oven at 125° C. The sample gelled hard in 42 minutes. A similar sample containing no amine salt was still in the liquid state after 6 hours at 125° C.

EXAMPLE XV

To 15 grams of a liquid epoxy resin which was essentially the diglycidyl ether of bisphenol A was added 9 grams of a soft solid phenolic novolac of melting point 125° F. and having a viscosity of about 500 cps. at 80° C. into which had been dissolved 1% by weight of the tetrachlorophthalic acid salt of 2-ethyl-4-methylimidazole. Both components were heated to about 60° C. to facilitate mixing. The mixture was placed in an oven at 125° C. The sample gelled hard in one hour. A similar mixture but containing none of the amine salt was still liquid after 6 hours at 125° C.

EXAMPLE XVI

To 15 grams of a liquid epoxy novolac resin having a functionality slightly greater than 2 and an epoxy equivalent weight of about 175 was added 9 grams of a soft solid phenolic novolac having a melting point of 125° F. and a viscosity of about 500 cps. at 80° C. into which had been dissolved 1% by weight (1% of the weight of the novolac) of the tetrachlorophthalic acid salt of 2-ethyl-4-methylimidazole. Both components were heated to about 60° C. to facilitate handling. The mixed sample was placed in an oven at 125° C. The sample gelled hard in 81 minutes. A similar sample containing no amine salt was still liquid after 6 hours at 125° C.

The salt catalyzed system had not changed in viscosity after a week at room temperature, indicating a degree of latency of the catalyst even in a liquid system.

Various changes and modifications in the catalytic tertiary amine acid addition sale and the improved epoxy resin systems containing such salts will occur to those skilled in the art and to the extent that such changes and modifications are embraced by the appended claims it is to be understood that they constitute part of the present invention.

We claim:

1. In the curing of epoxy resin systems which are normally catalyzed by tertiary amines, the improvement that comprises employing a latent catalyst and co-curing agent consisting of a water insoluble salt-like complex of a catalytically active tertiary amine with an acidic compound selected from the group consisting of tetrachlorophthalic acid and tetrabromophthalic acid, the proportion of amine to acid in said salt-like complex falling within the range of 1 to 3 amine equivalents to each 4 acid equivalents, the amount of said acid addition salt being about 0.25 to 10% based on the weight of reactive components in said system.

2. The improvement in the curing of epoxy resin systems as defined in claim 1 wherein the strongly basic and low molecular weight tertiary amine, triethylamine, is present in the ratio of 1 amine equivalent to 4 acid equivalents.

3. The improvement in the curing of epoxy resin systems as defined in claim 1 wherein the weakly basic and high molecular weight tertiary amine, 2,4,6-tridiamethylaminomethyl phenol, is present in the ratio of 3 amine equivalents to 4 acid equivalents.

4. The improvement in the curing of epoxy resin systems as defined in claim 1 wherein the tertiary amine is of intermediate basicity and molecular weight, and is present in the ratio of 1 amine equivalent to 2 acid equivalents.

5. The improvement in the curing of epoxy resin systems as defined in claim 1 wherein the tertiary amine is selected from the group consisting of triethanolamine, 2 methylimidazole, imidazole, 2 - ethyl - 4 - methylimidazole, triethylenediamine, 4 (N,N-dimethylaminomethyl) phenol and benzyldimethylamine.

6. The improvement in the curing of epoxy resin systems as defined in claim 1 wherein the acidic compound is tetrachlorophthalic acid.

7. The improvement in the curing of epoxy resin systems as defined in claim 1 wherein the acidic compound is tetrabromophthalic acid.

8. An improved epoxy resin system as defined in claim 1, wherein the reactive components include at least one epoxy resin selected from the group consisting of epoxy bisphenol A resins and epoxy novolac resins, and as hardener, a phenolic novolac resin.

9. An improved epoxy resin system as defined in claim 1, wherein the reactive components include at laest one epoxy resin selected from the group consisting of epoxy bisphenol A resins and epoxy novolac resins, and as hardener, a carboxylic acid anhydride.

10. An improved epoxy resin system as defined in claim 1 in the form of a stable fluid at room temperature, which is rapidly cured to a hard solid at temperatures of the order of 125° C.

11. An improved epoxy resin system as defined in claim 1 in the form of a stable powdered solid at room temperature, which fuses and cures to a hard continuous solid at temperatures of the order of 200° C.

References Cited
UNITED STATES PATENTS

| | | | |
|---|---|---|---|
| 2,935,492 | 5/1960 | Newey | 260—47 |
| 3,058,948 | 10/1962 | Mosimann | 260—47 |
| 3,420,785 | 1/1969 | Marcus | 260—47 |

MURRAY TILLMAN, Primary Examiner

PAUL LIEBERMAN, Assistant Examiner

U.S. Cl. X.R.

260—2, 47, 78.4, 37